United States Patent [19]
Walters

[11] Patent Number: 5,742,411
[45] Date of Patent: Apr. 21, 1998

[54] SECURITY HOLOGRAM WITH COVERT MESSAGING

[75] Inventor: Glenn J. Walters, Duxbury, Mass.

[73] Assignee: Advanced Deposition Technologies, Inc., Taunton, Mass.

[21] Appl. No.: 631,112

[22] Filed: Apr. 23, 1996

[51] Int. Cl.⁶ .............................. G03H 1/00; B42D 15/10
[52] U.S. Cl. ........................... 359/2; 283/91; 283/94; 283/902
[58] Field of Search ...................... 359/2, 3, 567, 359/572, 576; 283/86, 87, 91, 94, 902; 428/916

[56] References Cited

U.S. PATENT DOCUMENTS

| | | | |
|---|---|---|---|
| 5,080,463 | 1/1992 | Faykish et al. | 359/536 |
| 5,145,212 | 9/1992 | Mallik | 283/86 |
| 5,510,171 | 4/1996 | Faykish | 428/195 |
| 5,513,019 | 4/1996 | Cueli | 359/2 |
| 5,591,527 | 1/1997 | Lu | 428/411.1 |

OTHER PUBLICATIONS

"Label gives boot to bootlegged disks in Asia", Packaging Digest, Mar. 1996.

*Primary Examiner*—Jon W. Henry
*Attorney, Agent, or Firm*—Wolf, Greenfield & Sacks, P.C.

[57] ABSTRACT

A security device includes a holographic image observable in ambient light and through which a covert image is observable in a focussed beam of bright light, such as a flash light. The holographic image is coated with a metal layer of low optical density, while the covert image is produced by a metal layer of high optical density disposed away from an observer relative to the holographic image. The covert image may itself be amplified by positioning the high optical density layer on a layer of micro prisms.

13 Claims, 2 Drawing Sheets

5,742,411

SECURITY HOLOGRAM WITH COVERT MESSAGING

FIELD OF THE INVENTION

The present invention generally relates to authenticating devices, and more particularly relates to diffraction images used as security and anti-counterfeiting components of personal identification cards, credit cards, product labels, documents, currency and the like.

BACKGROUND OF THE INVENTION

Security holograms are frequently used to thwart counterfeiting of brand named goods and products such as software, computers, pharmaceuticals, and CD music disks.

Holograms are commonly used as authenticating devices since the hologram, providing a three-dimensional image, is difficult to copy or reproduce. Holograms are records of an interference pattern formed by light at a recording location. Typically a photographic plate, placed at the recording location, is used to make and preserve an original holographic record. Commonly, the recorded interference pattern is that of a three dimensional image of a subject. Holograms have attained widespread use as authenticating devices because they have historically been difficult to copy. However, along with the desirable characteristic of thwarting counterfeiting by being difficult to copy has come high cost. As equipment suitable for manufacturing security holograms has proliferated, so has the ability to counterfeit the devices. Ironically, despite the wider availability of counterfeit devices, costs have not fallen. Instead, more advanced devices have been developed to thwart the counterfeiter, driving the cost up. Such devices are therefore most useful in very high security applications which may be less cost-sensitive. Such advanced devices have been disclosed by the present inventor in his U.S. patent applications Ser. Nos. 08/438,776, filed May 11, 1995, and 08/561,191, filed Nov. 21, 1995, both still pending, and 08/604,329, filed Feb. 21, 1996 and now abandoned in favor of a file wrapper continuation Ser. No. 08/627,341, filed May 16, 1994, also still pending, and all incorporated herein by reference.

Commercial holograms, including those disclosed in the applicant's prior applications, are most commonly produced by embossing or casting a relief pattern on a thin film. The relief pattern is often a diffraction grating representative of the interference fringes of an original hologram, which may have been photographically recorded. The relief pattern is simply a pattern of ridges on a surface of the thin film. The spacing between the ridges and the width of the ridges corresponds to the spacing and width of the interference fringe pattern in the original hologram. However, the relief pattern itself is not readily seen because the reflectivity, scattering, or transmissivity is insufficient to produce a visible reconstructed light pattern. Most commercial holograms use a thin metallic layer to amplify the holographic relief pattern by reflection. Typically, the metal used for holograms in security devices is aluminum applied using a vacuum evaporative process.

Although not considered true holograms, various patterned diffraction gratings may also be produced by similar methods. While a hologram may be considered to be a special type of diffraction grating, non-hologram diffraction gratings are often sufficiently difficult to reproduce to be appropriate for use in some medium-security applications.

Various credit and identification cards, as well as some product labels, employ commercial holograms or diffraction gratings to deter counterfeiting by providing a visual indication of authenticity. Holograms are used in these and other applications, because the visual indication of authenticity is both difficult to reproduce by conventional means and easily verified by direct observation. For further security, the hologram or diffraction grating based security device may be secured to the document such that the security device will be destroyed or otherwise exhibit evidence of tampering upon any attempt to remove the security device. Security holograms are normally attached to a document by one of two methods which are selected to provide tamper evidence if one attempts to alter the protected document.

One attachment method is simply to use a pressure sensitive adhesive having a high sheer strength. The hologram is tightly pressed together with a document at room temperature to form a bond. If the sheer strength of the adhesive is sufficiently high, then the metal of the hologram is stripped away from the hologram if one attempts to remove the hologram from the document.

A more popular method of attachment, particularly in high volume operations such as found in applying holograms to credit cards, is a hot stamping technique. In hot stamping, the hologram is carried on a flexible carrier sheet with a wax-like release coating. The release coating is chosen to melt at a much lower temperature than the adhesive. After the hologram is fully pressed against the document at an elevated temperature, the hologram is pulled from the carrier and adheres to the document. In the hot stamping operation, a release layer is not used. Hot stamping also relies on a high sheer strength of the adhesive to visually alter the hologram during tampering, for example by removing metal from the hologram. Security and authenticating device customers seek both low cost and a level of security appropriate to the application. Holograms owe their high cost to the cost of origination of master artwork, the tooling to emboss or cast the relief pattern on a film and the slow speed at which these processes are performed. Notably, the base cost of materials is inconsequential relative to the final selling cost of an authenticating device.

It is desired to provide a more secure, yet economical security hologram device which can be visually authenticated.

SUMMARY OF THE INVENTION

It has been discovered that a standard holographic image when metallized with a light layer of metal, e.g. around 0.45 optical density, can be positioned over a pattern metallized micro prism layer such that the holographic image is visible under ordinary lighting conditions, but when the hologram is illuminated with a focused beam of bright light an image reflected from the partially metallized micro prism layer is evident.

In accordance with one embodiment of the invention, the layer closest to the observer, i.e. the top layer, is a lightly metallized layer on top of a holographic embossed clear plastic film. Approximately 60% of the ambient light is reflected back to the observer by the lightly metallized layer, revealing to the observer the holographic image. A layer within the structure and further from the observer is a heavily metallized layer on top of a retro reflective micro prism layer. Since the top metal layer is partially transparent, when a focussed beam of bright light is directed to the hologram, a portion of the light will pass through the holographic layer and then be retro reflected back to the viewer by the highly reflective micro prisms which have the heavy layer of metal thereon. The heavy layer of metal may form a pattern conveying a message or image. When such a pattern of metal is deposed on the micro prisms they will selectively reflect the message or image of the pattern back to the viewer. Thus, by pattern metallizing these prisms, for instance, with "AUTHENTIC", the viewer will be able to read this message through the holographic image by illuminating the hologram with a bright focused beam of light, such as a flash light.

In accordance with another embodiment, all the above-described layers may be provided, in the order indicated, on two surfaces of a single plastic substrate.

Many variations of the above embodiment are possible. One useful variation is to omit the retro reflective micro prisms. The heavily metallized layer is then provided on a flat surface. A similar, though less strong effect is achieved.

BRIEF DESCRIPTION OF THE DRAWINGS

In the drawings, in which like reference designations indicate like elements.

DETAILED DESCRIPTION

The invention will now be better understood in view of the following detailed description read in connection with the drawings.

Figure 1:
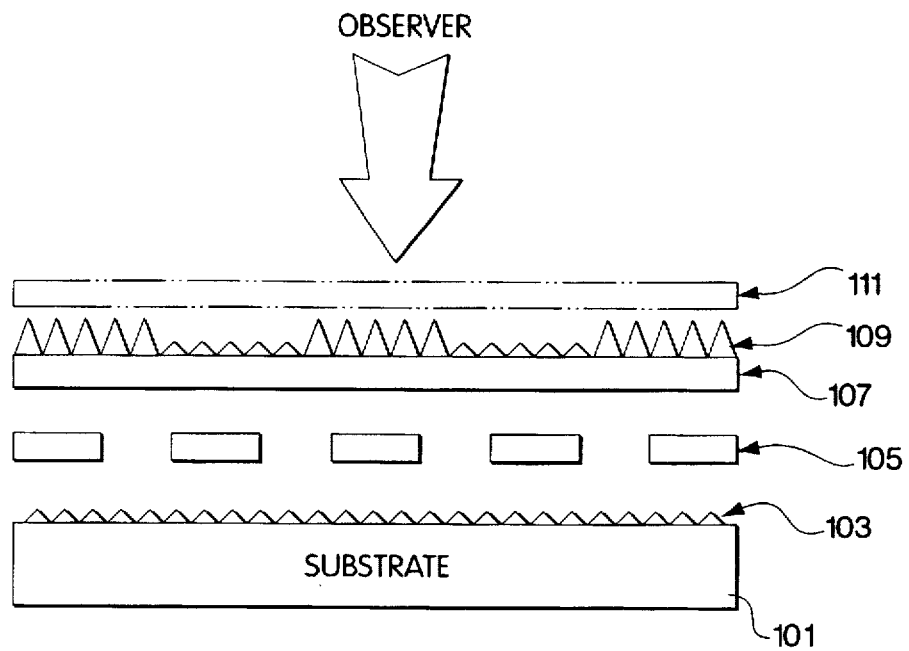
FIG. 1 is an exploded side view of one embodiment of the invention.

As shown in the embodiment of FIG. 1, a substrate layer of plastic 101, e.g. polyester or vinyl, is micro embossed with retro reflective prisms 103. Retro reflective prisms or corner-cubes are well-known, generally pyramidal shapes in which the upper flat surfaces form 90° angles with each other so light entering the prism through a base surface along a line is reflected back out along the same line. The retro reflective prisms 103 may alternately be formed by surface casting. This material is then pattern metallized 105 on the surface carrying the retro reflective prisms 103. The pattern metallization 105 may include a reversed image of graphics such as a logo or the words "secure", "authentic", "valid", etc. This material (101, 103 and 105) is then laminated to a second substrate 107 which is embossed or surface case with a holographic 2D/3D image 109 and has a 100% layer of metal 111 deposited on the surface relief image 109. However, unlike a normal hologram which is amplified by a layer of metal having an optical density of 2.0, a layer of metal 111 with an optical density less than 1.0 is used.

Figure 2:
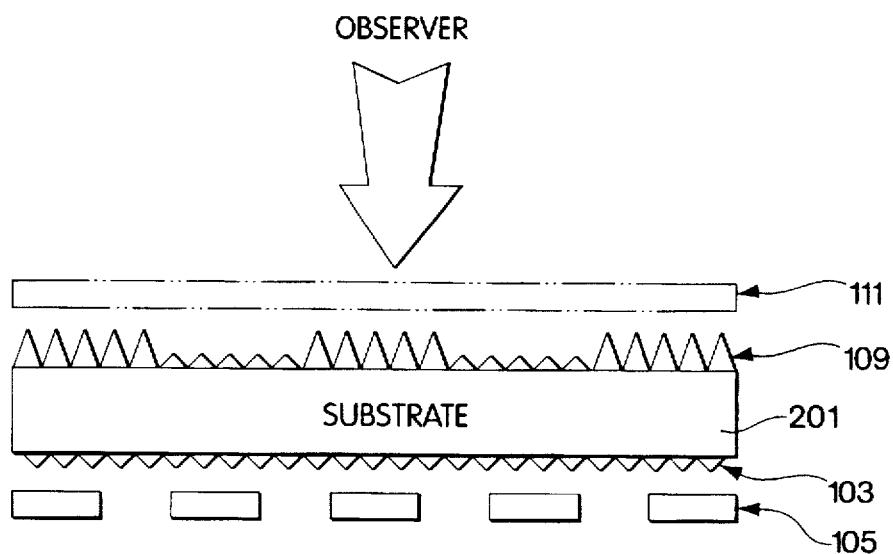
FIG. 2 is an exploded side view of a second embodiment of the invention.

An alternate construction, shown in FIG. 2 uses just one substrate 201. One surface of the substrate is embossed or surface cast with the retro reflective prisms 103, while the other surface is embossed or surface cast with the holographic surface relief image 109. A reversed image pattern metallized layer 105 is deposited on the retro reflective prism surface 103, while the holographic surface relief image 109 is completely covered by a layer of metal 111 of optical density less than 1.0.

The security device of the invention can be easily verified as authentic by use of a simple pen light. The security device is also more difficult to manufacture and thus is also more secure in view of the combined proprietary processes. The described structure is less expensive than using two labels. Additionally, the structure can be produced such that the device will self-destruct if it is attempted to be removed by use of appropriate adhesives between layers. Finally, less space is required for the security device than if two security devices were required. This is important on some consumer its where label space is a premium.

Figure 3:
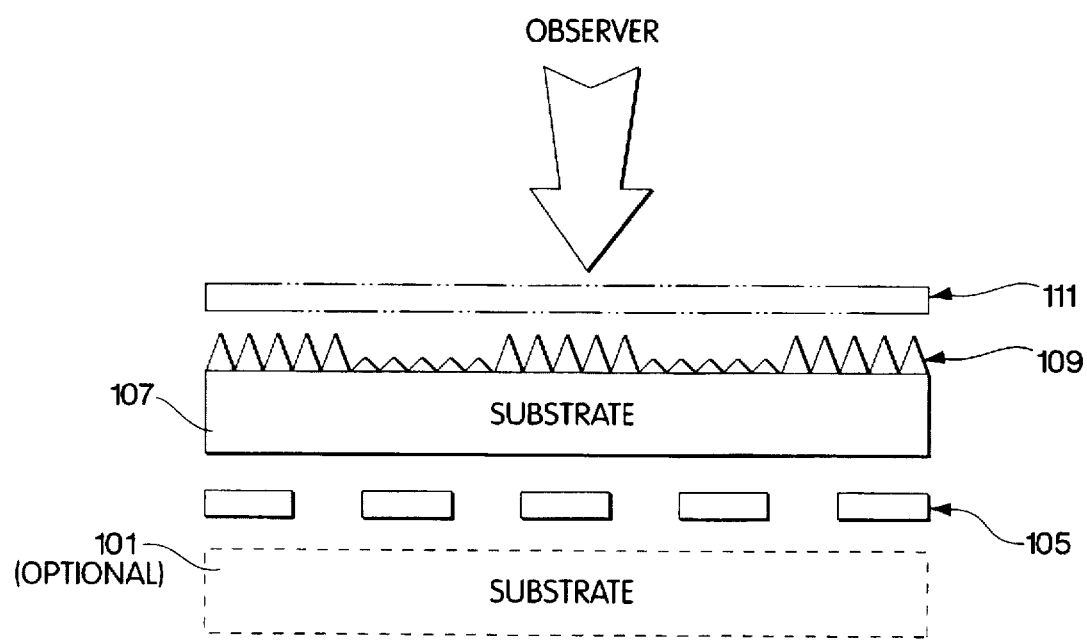
FIG. 3 is an exploded side view of a third embodiment of the invention.

Substrates 101, 107 and 201 of polyester or vinyl are particularly suitable. The patterned layer 105 is preferred to have an optical density of about 2.0, while the metal layer 111 on the hologram 109 is preferred to have an optical density of about 0.45. Variations are also possible. For example, the metal layer 111 on the hologram 109 may also be patterned. Finally, as shown in FIG. 3, the micro prisms 103 may be omitted, if less amplification of the covert message can be tolerated in a particular application. In this variation, pattern metallized layer 105 is applied directly to a flat surface of substrate 107 or 101. The invention disclosed herein may also be combined with various of the inventor's other inventions cited herein to form more complex structures.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto and equivalents thereto.

What is claimed is:

1. A security hologram, comprising:

a first substrate;

a semi-transparent metal layer;

a surface-relief hologram disposed on one surface of the substrate, and on which the semi-transparent metal layer is disposed;

a micro prism layer positioned for observation through the surface-relief hologram; and an opaque patterned metal layer disposed on the micro prism layer;

whereby the surface-relief hologram is observable in ambient light and the patterned metal layer is observable in a focussed beam of bright light.

2. The hologram of claim 1, wherein the semi-transparent metal layer has an optical density less than 1.0.

3. The hologram of claim 2, wherein the semi-transparent metal layer has an optical density of about 0.45.

4. The hologram of claim 2, wherein the opaque patterned metal layer has an optical density of about 2.0.

5. The hologram of claim 1, further comprising a second substrate, the micro prism layer formed on the second substrate.

6. The hologram of claim 1, the micro prism layer formed on the first substrate.

7. A security hologram comprising:

a substrate;

a surface-relief hologram disposed on one surface of the substrate;

an opaque patterned metal layer disposed on a second surface of the substrate; and a semi-transparent metal layer disposed on the surface-relief hologram, the metal layer of an optical density sufficient to render the surface-relief hologram observable in ambient light and to render a pattern formed by the patterned metal layer non-observable in ambient light unless illuminated by a focussed beam of bright light.

8. The hologram of claim 7, wherein the semi-transparent metal layer has an optical density less than 1.0.

9. The hologram of claim 8, wherein the semi-transparent metal layer has an optical density of about 0.45.

10. The hologram of claim 8, wherein the opaque patterned metal layer has an optical density of about 2.0.

11. A security label, comprising:
    a metallized surface relief hologram having a reflectance of about 60% in ambient light; and
    a patterned metal reflector disposed in a position where an observer views the patterned metal reflector through the metallized surface relief hologram, wherein the patterned metal reflector is disposed on a substrate having a surface of retro-reflective prisms.

12. The security label of claim 11, wherein the patterned metal reflector is formed of an aluminum layer of optical density of about 2.0.

13. The security label of claim 11, wherein the metallized surface relief hologram is metallized with a layer of aluminum of optical density of less than 1.0.

* * * * *